United States Patent [19]

Jüntgen et al.

[11] Patent Number: 5,064,801
[45] Date of Patent: Nov. 12, 1991

[54] PROCESS FOR MANUFACTURING A CARBON CATALYST

[76] Inventors: Harald Jüntgen, Bonscheidter Str. 79; Karl Knoblauch, Semperstr. 55; Ekkehard Richter, Schmachtenbergstr. 89; Helmut Kühl, Steeler Str. 540, all of D-4300 Essen, Fed. Rep. of Germany

[21] Appl. No.: 434,682

[22] PCT Filed: Mar. 10, 1988

[86] PCT No.: PCT/EP88/00184
§ 371 Date: Oct. 24, 1989
§ 102(e) Date: Oct. 24, 1989

[87] PCT Pub. No.: WO88/07410
PCT Pub. Date: Oct. 6, 1988

[30] Foreign Application Priority Data

Mar. 28, 1987 [DE] Fed. Rep. of Germany ....... 3710272

[51] Int. Cl.$^5$ .................. B01J 21/18; B01J 20/20; C01B 31/10; B01D 53/36
[52] U.S. Cl. ................... 502/180; 264/29.5; 423/239; 502/430; 502/432; 502/434
[58] Field of Search ............... 502/429, 428, 433, 434, 502/431, 430, 435, 432; 264/29.5

[56] References Cited

U.S. PATENT DOCUMENTS

| | | | |
|---|---|---|---|
| 3,623,999 | 11/1971 | Jungten et al. | 502/429 |
| 4,124,529 | 11/1978 | Jungten et al. | 502/432 |

FOREIGN PATENT DOCUMENTS

| | | |
|---|---|---|
| 2433076 | 2/1975 | Fed. Rep. of Germany . |
| 3029639 | 3/1982 | Fed. Rep. of Germany . |
| 8601741 | 3/1986 | World Int. Prop. O. . |
| 8605711 | 10/1986 | World Int. Prop. O. . |

OTHER PUBLICATIONS

A Dictionary of Mining, Mineral and Related Terms, Paul W. Thrush, U.S. Department of the Interior, p. 526 (1968).
Ullmanns Encyclopedia of Technical Chemistry, vol. 14, pp. 126–129, 296–297, 620–623 (1977).

*Primary Examiner*—Paul E. Konopka
*Attorney, Agent, or Firm*—Herbert Dubno; Jonathan Myers

[57] ABSTRACT

A process for manufacturing a carbon catalyst for use in $NO_x$ reduction with ammonia catalyzed by active carbons and active cokes is described. The new carbon catalyst exhibits improved catalytic activity and hence a higher yield in NO. In the manufacturing process, a mixture of ground, oxidized hard coal and binders is moulded, carbonized at temperatures between 700° and 900° C., and then activated with steam at a temperature of 800° to 850° C. for 45 to 100 minutes, until a degree of activation of 5 to 15% is obtained.

2 Claims, No Drawings

PROCESS FOR MANUFACTURING A CARBON CATALYST

The invention relates to a process for the manufacturing a carbon catalyst for use in the $NO_x$ reduction with ammonia, wherein ground and oxidized hard coal mixed with binders is molded, carbonized at temperatures between 700° and 900° C. and subsequently activated with steam.

It is known from the German open application 124 33 076 that activated carbons act as catalysts in the reduction of nitrogen oxide with the use of ammonia.

In the German open application 35 12 168 it is disclosed that activated cokes, which have not been subjected to steam activation, have a better catalytic action in the reduction of nitrogen oxides with ammonia. But even with the use of activated coke, the NO-conversion is still comparatively low.

It is the object of the invention to produce a carbon catalyst which has an improved catalytic activity, and thus a higher degree of NO-conversion.

This object is attained by subjecting activated cokes to an activation treatment with steam at temperatures between 800° and 850° C. and a dwelling time of 45 to 100 minutes, until an activation degree of 5 to 15% is reached. The activation degree is defined as the rate of the carbon weight loss percentage to the weight of the initial material. This because in tests it has been surprisingly established that such carbon catalysts have a higher $NO_x$-conversion, than non-activated active cokes and than activated carbons with an activation degree of over 15%.

The carbon catalysts produced this way have a mean random reflectance $\bar{R}_r$ between 4.5 and 5.5%. The determination of the mean random reflectance (mean random reflectance) $\bar{R}_r$ (%) of coal and carbon catalysts is performed with a "T.A.S." of the Firm Leitz in agreement with DIN 22 020 (T.A.S. = Texture Analysis System). Thereby, it is a matter of the arithmetic mean of the mean random reflectance of the randomly cut mirror-finished catalysts particles which are bound in a synthetic resin.

Considered in this determination were 250 image areas, each having 512 times 512 image points. This results in a total of over 65 Million individual values determining the reflectance distribution. From there, the arithmetic mean of the mean random reflectance $\bar{R}_r$ (%) is calculated. This method is normally used in coal petrography. The process wherein the originally sedimentated vegetable matter is transformed via peat coal into brown coal and hard coal is called carbonization. The carbonization degree is not a directly measurable value. Therefore, a certain physical or chemical property has to be measured which during the carbonization process changes constantly, e.g. the reflectance degree of the vitrain.

Surprisingly, it has been proven that also the pregraphitic crystal structure of the carbon catalysts can be closer characterized due to this method. It has been found that carbon catalysts with a mean random reflectance of 4.5 to 5.5% have a particularly strong catalytic activity so that particularly favorable $NO_x$-conversions can be achieved therewith and which are superior to the conversions obtained with non-activated active coke or activated carbon.

EXAMPLE

An activated coke is produced in the known manner, molding ground and oxidized hard coal mixed with binders, and carbonizing them at temperatures between 700° and 900° C. This activated coke is subsequently activated in a fluidized bed with steam at temperatures between 800° and 900° C. The dwelling times and the temperatures depending on the activation degree are indicated in the following Table 1.

TABLE 1

| dwelling time (min) | temperature (°C.) | activation degree (%) |
|---|---|---|
| 45 | 800 | 5.0 |
| 80 | 800 | 9.0 |
| 80 | 850 | 12.0 |
| 100 | 850 | 15.0 |
| 30 | 900 | 19.0 |
| 70 | 900 | 50.0 |
| 90 | 900 | 65.0 |

The carbon catalysts produced according to the example are tested as to their catalytic activity in the reduction of $NO_x$ with ammonia in a reactor with a diameter of 55 mm and a height of 400 mm. The test temperature is approximately 100° C., the initial concentrations are:
780 vpm: NO
800 vpm: NH
6 Vol.-%: $O_2$
10 Vol.-%: $H_2O$
balance nitrogen The dwelling time of the gas in the reactor is of 6 sec., with reference to the gas in standard condition. Also in the catalysts the mean random reflectance $\bar{R}_r$ according to DIN 22020 was measured. The results are indicated in the following Table 2.

TABLE 2

| activation degree (%) | $\bar{R}_r$ (%) | $U_{NO}$ (%) | |
|---|---|---|---|
| 0 | 5.2 | 62 | activated coke |
| 5.0 | 5.5 | 73 | |
| 9.0 | 5.1 | 70 | carbon catalyst |
| 12.0 | 4.9 | 70 | |
| 15.0 | 4.5 | 68 | |
| 19.0 | 4.1 | 59 | |
| 50.0 | 3.6 | 55 | activated carbon |
| 65.0 | 3.4 | 48 | |

The tests prove that the catalytic activity, measured by the NO-conversion ($U_{NO}$), is the strongest in the case of carbon catalysts which have been only slightly activated with steam (activation degree of 5% to 15%). The mean random reflectance $\bar{R}_r$ falls within the range of 4.5 to 5.5%.

We claim:

1. A process for manufacturing a carbon catalyst for $NO_x$-reduction with ammonia, which comprises the steps of:
   (a) molding ground, oxidized hard coal mixed with a binder;
   (b) carbonizing the ground, oxidized hard coal mixed with a binder at a temperature between 700° and 900° C. to obtain the carbon catalyst; and
   (c) following step (b), activating the carbon catalyst at a temperature between 800° and 850° C. with steam over a dwelling time of 45 to 100 minutes so that the carbon catalyst has a mean random reflectance of 4.5 to 5.5% and until an activation degree of 5 to 15% is reached.

2. The process of claim 1 for manufacturing a carbon catalyst for $NO_x$-reduction with ammonia wherein according to step (c) the carbon catalyst is activated at a temperature of 800° C. with steam over a dwelling time of 45 minutes so that the carbon catalyst has a mean random reflectance of 5.5% and until an activative degree of 5.9% is reached.

* * * * *